US006141867A

United States Patent [19]

Fukada et al.

[11] Patent Number: 6,141,867

[45] Date of Patent: Nov. 7, 2000

[54] WIRE ASSEMBLY MANUFACTURING EQUIPMENT

[75] Inventors: Kazumitsu Fukada; Takaaki Nakaseko, both of Matsuzaka, Japan

[73] Assignee: Sumitomo Wiring Systems, Ltd., Yokkaichi, Japan

[21] Appl. No.: 09/222,303

[22] Filed: Dec. 28, 1998

[30] Foreign Application Priority Data

Dec. 26, 1997 [JP] Japan .................................... 9-359948

[51] Int. Cl.[7] ...................................................... B23P 19/00

[52] U.S. Cl. .............................................. 29/747; 29/33 M

[58] Field of Search ................................. 29/33 M, 33 F, 29/439, 747, 748

[56] References Cited

U.S. PATENT DOCUMENTS

| | | | |
|---|---|---|---|
| 4,701,007 | 10/1987 | Jonca . | |
| 4,838,407 | 6/1989 | Komuro | 198/406 |
| 4,862,927 | 9/1989 | Dorman et al. | 140/92.1 |
| 4,888,864 | 12/1989 | Masaki | 29/753 |
| 4,955,927 | 9/1990 | Aiello | 29/861 |
| 5,127,159 | 7/1992 | Kudo et al. | 29/863 |
| 5,198,983 | 3/1993 | Blake et al. | 364/468 |
| 5,283,950 | 2/1994 | Fischer | 29/884 |
| 5,365,659 | 11/1994 | Ueda et al. | 29/863 |
| 5,457,875 | 10/1995 | Ohta et al. | 29/747 |
| 5,659,949 | 8/1997 | Ohba et al. | 29/753 |
| 5,682,672 | 11/1997 | Taniguchi et al. . | |
| 5,718,097 | 2/1998 | Kinoshita et al. | 53/75 |

FOREIGN PATENT DOCUMENTS

| | | |
|---|---|---|
| 733924 | 9/1996 | European Pat. Off. . |
| 8-138826 | 5/1996 | Japan . |

*Primary Examiner*—Lee Young
*Assistant Examiner*—Kevin G. Vereene
*Attorney, Agent, or Firm*—Greenblum & Bernstein, P.L.C.

[57] ABSTRACT

Wire assembly manufacturing equipment is provided. The equipment includes an automatic insertion device mounted on a wire connection supporting device. The equipment enables another end of a terminal-attached wire with which an operator carries out connection work by the wire connection supporting device to be automatically inserted by the automatic insertion device. Simultaneously with or immediately after the work that connects one end of the terminal-attached wire by manual operation, automatic insertion becomes possible on the other end with the automatic insertion device. An inspection apparatus is also provided for determining the condition of a connector having at least one terminal attached wire inserted into a cavity therein, the connector being formed as a double lance type having a temporarily fastened retainer. The inspection apparatus includes a press mechanism capable of pressing with a predetermined load in order to finally fasten the retainer which is temporarily fastened to the double lance type connector, a measuring system for measuring the displacement of the retainer pressed by the pressing mechanism, and a discriminator that discriminates a good/bad condition between the connector and the terminal based on the displacement of the retainer.

9 Claims, 15 Drawing Sheets

WIRE ASSEMBLY MANUFACTURING EQUIPMENT

BACKGROUND OF THE INVENTION

1. Field of the Invention

A method for carrying out assembly on a work table (many of which are movable) called a wiring board is widely known. When manufacturing a complicated wire assembly having a circuit structure such as a wire harness for an automobile, the method initially manufactures a number of individually made circuits in a final form.

2. Description of Background Information

A known method for producing the above-mentioned wire assembly connects a terminal of a terminal-attached wire with a connector by an automatic insertion device (for example, refer to Japanese Unexamined Patent Publication No. (Hei) 9-17253). According to another known method an operator manually connects a terminal-attached wire with a connector. With the latter method a piece of equipment or a method must be provided to support the connecting work. The piece of equipment or method indicates to an operator a pole of the connector based on a terminal to which the operator must connect or a terminal the operator has selected. For example, refer to Japanese Unexamined Patent Publication No. (Hei) 8-167333.

SUMMARY OF THE INVENTION

The present invention relates to wire assembly manufacturing equipment. In particular, the present invention relates to inserting wires into connectors to create a wire assembly. Generally speaking, a wire harness or wire assembly (hereinafter referred to as a "wire assembly") is a wiring system which assembles more than one insulated wire and a connector connecting the insulated wires in a relatively complicated arrangement. In order to effectively manufacture a finished wire assembly, the wire assembly must be quickly and accurately executed at an intermediate stage before carrying out wiring to produce a finished assembly. However, none of the aforementioned prior art has sufficiently fulfilled the need of such requirements. That is, when an automatic insertion device inserts a wire assembly, insertion work was delayed due to the sophisticated and precise control necessary to drive parts such as a wire plug, etc. The delay ultimately retards the wiring process unless such measures as increasing the number of automatic insertion devices, etc. were implemented. In addition, the prior systems are saddled with the inconvenience of mounting exterior components, such as corrugated tubes and grommets, to the wire assembly.

The present invention was made in consideration of the above-mentioned inconvenience, with the object to provide wire assembly manufacturing equipment capable of quickly and more accurately, that is, more effectively manufacturing a wire assembly.

In order to solve the above mentioned problems, the present invention is directed to providing wire assembly manufacturing equipment including a wire connection supporting device, including a plurality of wire housing areas which house, by classifying by the type of wires in advance, a terminal-attached wire formed by attaching a terminal with at least either one-end area of measured length of insulated wire. A connector holder holds a terminal of terminal attached wire in such a manner that it can be manually inserted, and a wire specifying system is provided for specifying a type of connector of the terminal-attached wire removed from the wire housing area by an operator.

A memory is provided for storing connection data required for connecting the terminal-attached wire specified by the wire specifying system, and the equipment also includes a designator for designating to an operator a cavity of the connector which corresponds to a terminal of the terminal-attached wire specified by the specifying system based on the stored connecting data. Furthermore, an automatic insertion device is also provided on the wire connection supporting device, and includes a device for retaining a cartridge capable of holding in an aligned condition a terminal area at the opposite end of a terminal to be connected with a connector mounted on the connector holder. The automatic insertion device also includes a cartridge holder for detachably holding the cartridge, and a control is further provided to control the terminal insertion action based on the connection data of terminal-attached wire which is specified by the wire specifying means.

According to a first aspect of the present invention, automatic insertion can be achieved in parallel with manual connection work of one end-area of the terminal-attached wire. Alternatively, automatic insertion can be accomplished immediately after the work. The parallel or sequential operations are enabled by equipping an automatic insertion device with a wire specifying system for a wire connection supporting device, and combining the operation of the wire specifying system for the wire connection supporting device with the automatic insertion device. Subsequently, an operator mounts a terminal area of the terminal-attached wire into a cartridge and then performs terminal work after mounting the cartridge on the automatic insertion device.

It is preferable to form the wire specifying system in connection with a removal detecting sensor, a manual work side terminal conductive device, and an automatic insertion device side terminal conductive device. The removal detecting sensor detects a terminal-attached wire which has been removed from a wire housing area. The manual work side terminal conductive device is electrically conductive with a terminal connected with a connector supported by a connector holder. The automatic insertion device side terminal conductive device is selectively connected with a terminal supplied to the automatic insertion device by a cartridge. In such a case, it is possible to dictate a connection procedure by specifying a connection procedure to an operator sequentially in accordance with the condition of the terminal-attached wire to be connected. It is also possible to dictate a connection procedure by specifying the terminal-attached wire in response to wires arbitrarily removed by the operator.

In a preferred embodiment of the present invention, the connector inserted by the wire connection supporting device is composed of a double lance method having a fastened retainer, a pressing mechanism, a measuring system and a discriminator. The pressing mechanism can be pressed with a predetermined force to fasten a retainer which is temporarily fastened to the connector of the double lance method. The measuring system measures a displacement of the retainer caused by the pressure of the pressing mechanism. The discriminator discriminates between a good/bad state of a press-fit condition between the terminal and the connector. The discrimination is based upon the displacement of the retainer being measured.

According to another aspect of the present invention, when the retainer is pressed by the pressing mechanism after terminal connection, the temporarily fastened retainer is fully fastened and the displacement of the fully fastened retainer is measured by the measuring system. Then, the adequacy of the press-fit condition between the terminal and the connector is measured by the discriminator. The discriminator does not discern the fastened condition of the retainer, but rather discerns a press-fit condition between the terminal and the connector. That is, when the terminal and the connector are normally press-fit, the retainer can be press-fit to the normal position by a predetermined press-fit force. Whereas when the press-fitting between the terminal and the connector is improper, the force required for press-fitting the retainer becomes larger than normal. It follows from this property that by measuring the displacement value of the retainer when the retainer is press-fit with a certain force, it can be determined whether the press-fit condition between the terminal and the connector is good or bad.

According to another aspect of the wire connection supporting device of the present invention, an accompanying work treatment area is provided to operate on the opposite end-area of the corresponding end-area of the terminal-attached wire being held by the cartridge. By utilizing the accompanying work treatment area in parallel with the operator inserting the terminal attached wire, concomitant work can be accomplished simultaneously with the corresponding automatic insertion of the terminal-attached wire.

Because the operator can usually perform terminal-insertion work faster than the automatic insertion device, waiting time can be reduced by having the operator complete the accompanying work. The accompanying work referred to here is, for instance, such work as mounting exterior components like corrugated tubes, grommets and the like into terminal-attached wires, and also, forming a twisted wire by twisting the terminal-attached wire. Exemplary accompanying work treatment systems include, but are not limited to, a grommet opening device and a wire twisting device.

According to a further aspect of the present invention, a conveyor is provided. The conveyor is installed near the wire connection supply device and rotates a wiring board. The wiring board is capable of wiring the terminal-attached wire which became a wire assembly after completion of the connection work.

According to another aspect of the present invention, an alarm system associated with the conveyor may be provided to sound an alarm in response to the position of the terminal-attached wire on the conveyor. The operator's working time with the wire connection supporting device can be controlled in accordance with a work speed of the line due to the alarm. The alarm alerts the operator of the wire connection supporting device's moving condition on the conveyor when wiring the wire assembly is on a wiring board transported by the conveyor.

According to still another aspect of the present invention, a wire assembly manufacturing apparatus is provided and is equipped with a wire connection supporting device. The wire assembly manufacturing apparatus includes a plurality of wire housing areas which house wires previously classified by type, and the wires are terminal-attached wires formed by attaching a terminal to at least one end of a measured length of insulated wire. A connector holder for holding at least one connector is provided, with each connector receiving a respective terminal of the terminal-attached wire, and the terminal is manually inserted by an operator.

The apparatus further includes a wire specifying system that specifies a type of connector for the terminal-attached wire removed from the wire housing area by the operator, a memory that stores connection data for connecting the terminal-attached wire specified by the wire specifying system, and a designator that designates to an operator, a cavity of the connector which corresponds to the terminal of the terminal-attached wire specified by the specifying system based on the stored connection data.

Additionally, an automatic insertion device is provided on the wire connection supporting device for inserting the terminal into a connector after removing the terminal from a cartridge mounted on a cartridge holder. The automatic insertion device retains a cartridge capable of holding in an aligned condition. A terminal area is provided at the opposite end of the terminal to be connected with the connector mounted on the connector holder, and the automatic insertion device also retains the cartridge holder for detachably holding the cartridge. Additionally, a controller is provided that controls the terminal insertion action of the automatic insertion device based on the connection data for the terminal-attached wire specified by the wire specifying system.

In another aspect of the invention, the wire assembly manufacturing equipment further includes a connector to be inserted by one of the wire connection supporting device and the automatic insertion device. The connector may be formed as a double lance type having a temporarily fastened retainer. A press mechanism is provided that is capable of pressing with a predetermined load in order to finally fasten the retainer which is temporarily fastened to the double lance type connector. Additionally, the equipment further includes a measuring system capable of measuring the displacement of the retainer pressed by the pressing mechanism, and a discriminator that discriminates a good/bad condition between the connector and the terminal based on the displacement of the retainer.

In still another aspect of the present invention, the wire connecting supporting device of the wire assembly manufacturing equipment further includes an accompanying work treatment system to manually carry out accompanying work on the end of the wire opposite to the end area retained by the cartridge.

In yet another aspect of the present invention, the wire assembly manufacturing equipment further includes a conveyor mounted near the wire connection supporting device, the conveyor transports a wiring board to enable wiring of the terminal-attached wire which becomes a wire assembly after completing the connecting work, and an alarm which indicates to an operator a time for wiring the terminal-attached wire by detecting the approach of the wiring board to the wire connection supporting device.

According to another aspect of the present invention, an inspection apparatus is provided for determining the condition of a connector having at least one terminal attached wire inserted into a cavity therein, the connector being formed as a double lance type having a temporarily fastened retainer. The inspection apparatus includes a press mechanism capable of pressing with a predetermined load in order to finally fasten the retainer which is temporarily fastened to the double lance type connector, a measuring system for measuring the displacement of the retainer pressed by the pressing mechanism, and a discriminator that discriminates a good/bad condition between the connector and the terminal based on the displacement of the retainer.

BRIEF DESCRIPTION OF THE DRAWINGS

The above and other features and advantages of the present invention will be made apparent from the following description of the preferred embodiments, given as non-limiting examples, with reference to the accompanying drawings in which.

DETAILED DESCRIPTION OF THE PREFERRED EMBODIMENTS

Figure 1:
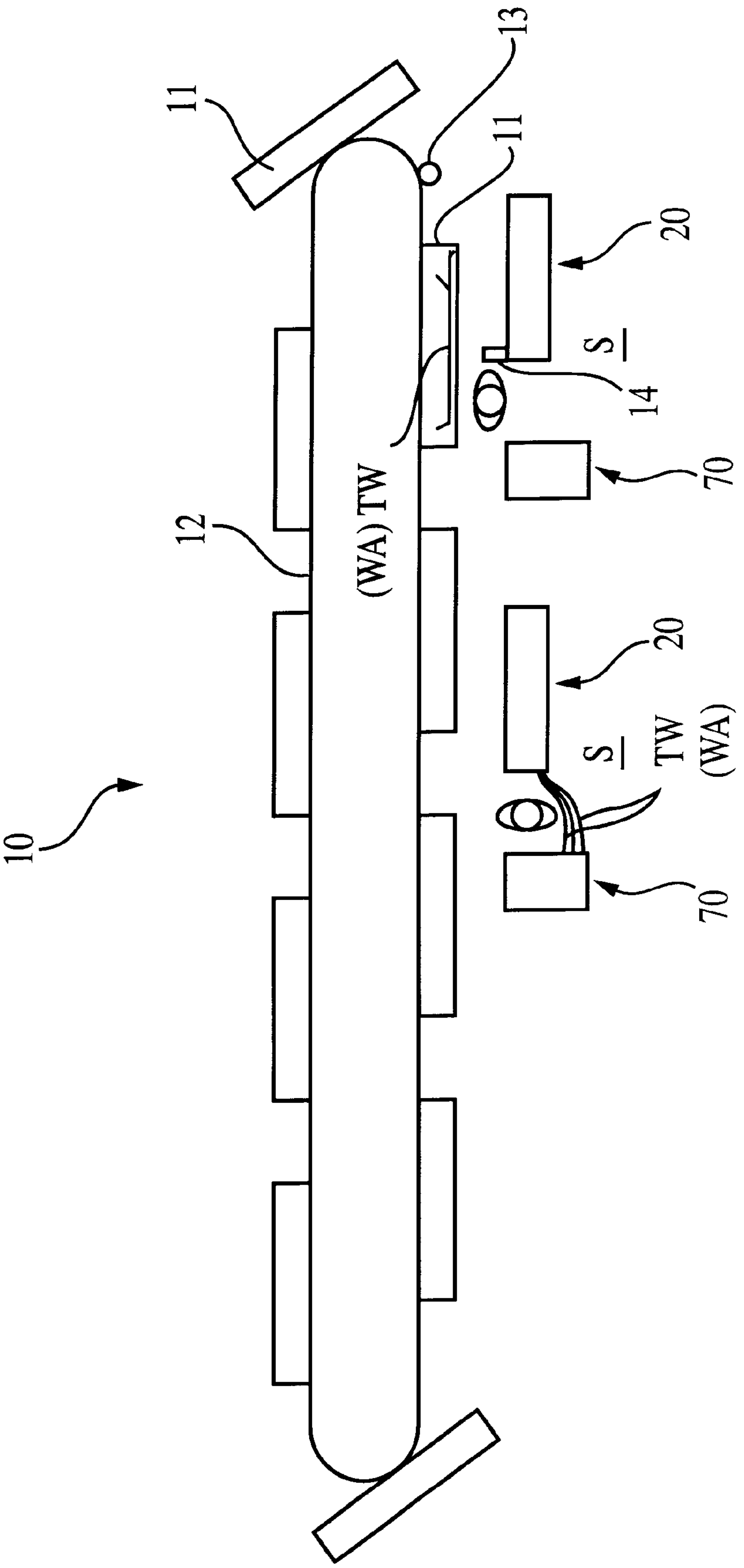
FIG. 1 is a schematic plan view showing an outline structure of wire assembly manufacturing equipment, according to a preferred embodiment of the present invention.
Figure 2:
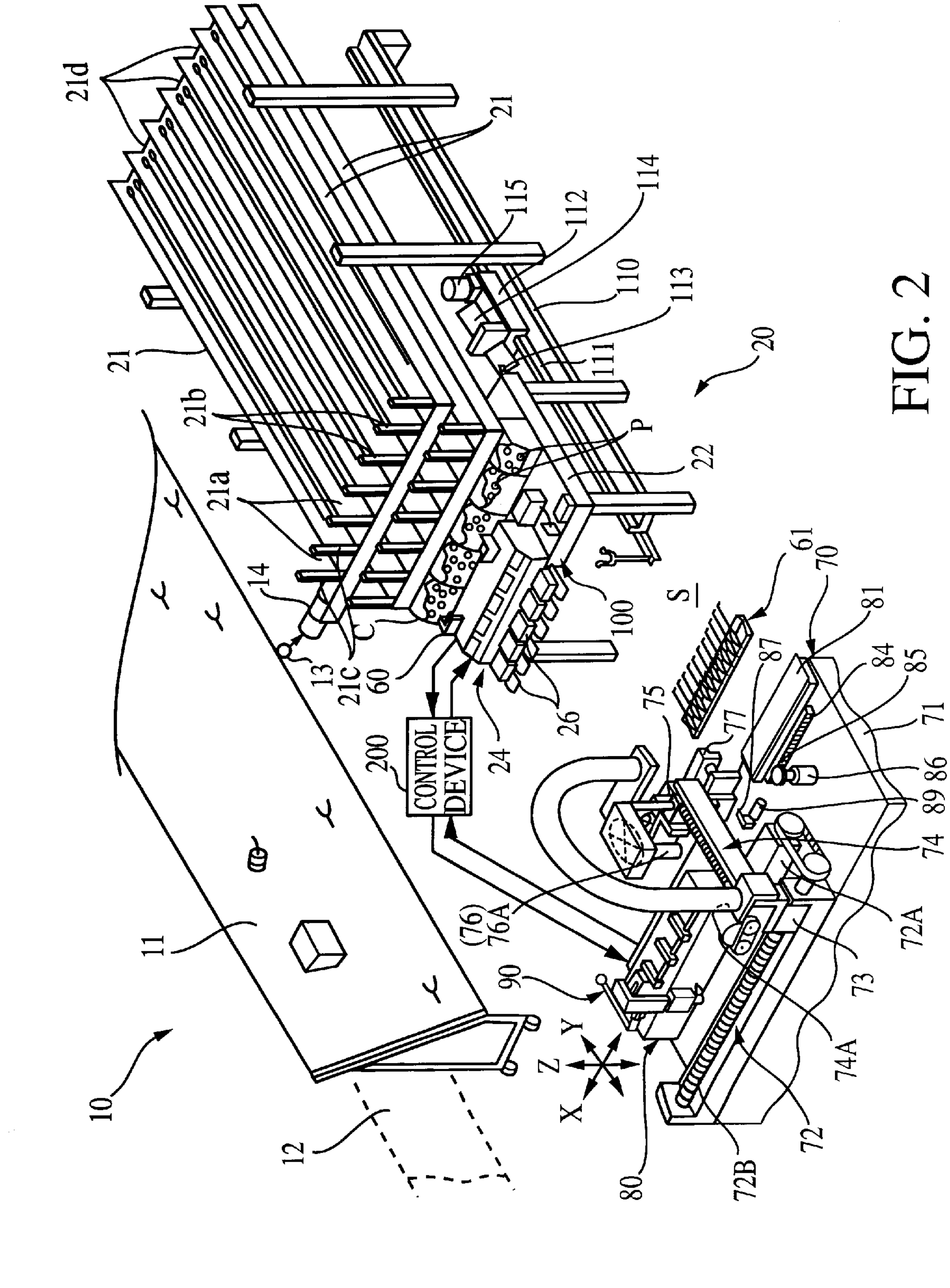
FIG. 2 is a perspective view showing selected features of the wire assembly manufacturing equipment illustrated in FIG. 1.

Description follows below of preferred embodiments of the present invention with reference to the attached drawings. FIG. 1 is a schematic plan view of the wire assembly manufacturing equipment 10 according to a preferred embodiment of the present invention. FIG. 2 is a perspective view showing a portion of the wire assembly manufacturing equipment illustrated in FIG. 1.

Referring to these drawings, an endless conveyor 12 is provided which continuously transfers a movable type wiring board 11 between several connecting stations S located at a predetermined position relative to the conveyor 12. The connecting stations S manufacture several sub-assemblies WA. The sub-assembly WA manufactured at each connecting station S is wired for the wiring board 11 when the wiring board is transported to the connecting station S. The assembly process continues as a wiring board 11 proceeds from connecting station S to connecting station S until the final form of the wire assembly WA is produced.

A position detecting sensor 13 is provided for outputting the position of the wiring board 11. When the wiring board 11 approaches a certain position relative to the wire connection supporting device 20, based upon the output of the detecting sensor 13, a lamp 14 mounted on the wire connection supporting device is illuminated, preferably with three different illumination sections, e.g., re, yellow, and green illumination sections. Thus, the working time is controlled by informing the operator of the position of the wiring board. Also, the green illumination section is illuminated during normal operation to indicate that an operator may continue, and the yellow section is illuminated when a completed wiring assembly WA is to be moved to the wiring board 11. The red illumination section indicates the highly unusual situation where the endless conveyor must be stopped.

Each connecting station S is equipped with a wire connection supporting device 20 which allows an operator to manually connect a terminal attached wire TW. The wire connection supporting device 20 is equipped with, for example, a wire housing area 21 and a work bench 22. The wiring housing area 21 has two parallel layers, and the work bench 22 is arranged at one end of the wire housing area 21. Each wire housing area 21 is formed to have a plurality of wire receiving troughs 21*d*. The end of the area housing 21 nearest the work bench 22 has the two layers of the wire housing area arranged in a step-like fashion above the work bench 22. On this end, a gate 21*a* is provided for each trough 21*d* in front of the work bench 22 which facilitates operator removal of the terminal attached wire TW. As is well known, at each gate 21*a* an optical sensor 21*b* and an indicating lamp 21*c* are mounted. The optical sensor 21*b* operates as a removal detecting device for detecting operator removal of the terminal attached wire TW from a respective gate 21*a*. The indicating lamp 21*c*, which is positioned on the front side of a gate but may be located anywhere on the gate, indicates to an operator a selected gate 21*a* corresponding to the terminal attached wire TW to be removed (refer to FIG. 13).

Figure 5:
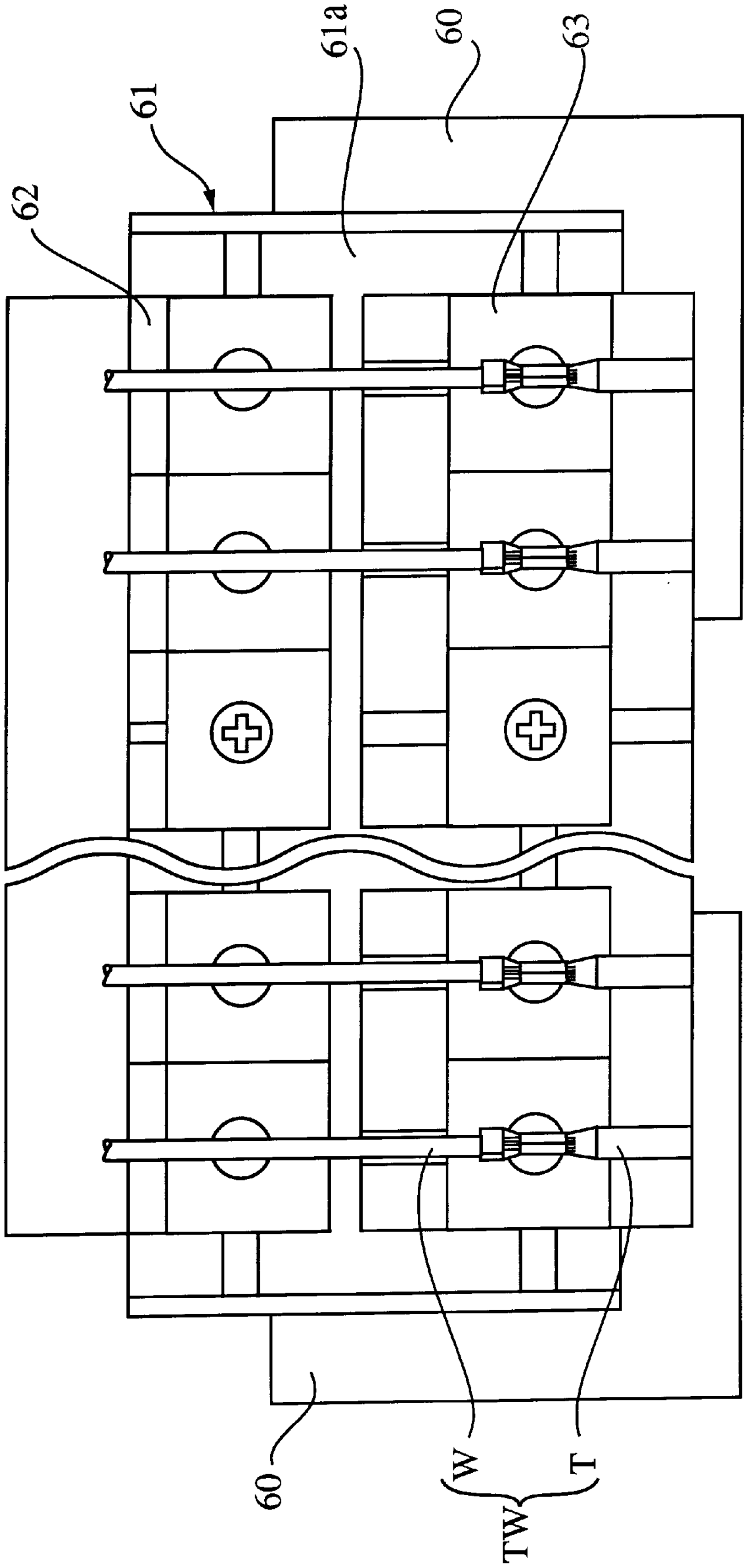
FIG. 5 is a schematic plan view showing a partially broken away cartridge, according to a preferred embodiment of the present invention.

The terminal attached wire TW housed in the wire housing area 21 is formed by stripping the end of insulated wire W and attaching a crimp style terminal T (refer to FIG. 5). On the work bench 22, a component housing area is provided in which a connector C for connecting a terminal attached wire TW and external component P (corrugated tube, grommet, etc.) are housed and classified according to their type. In addition, a connector holder 24 is provided and located in front of the component housing and holds each connector C.

Figure 3:
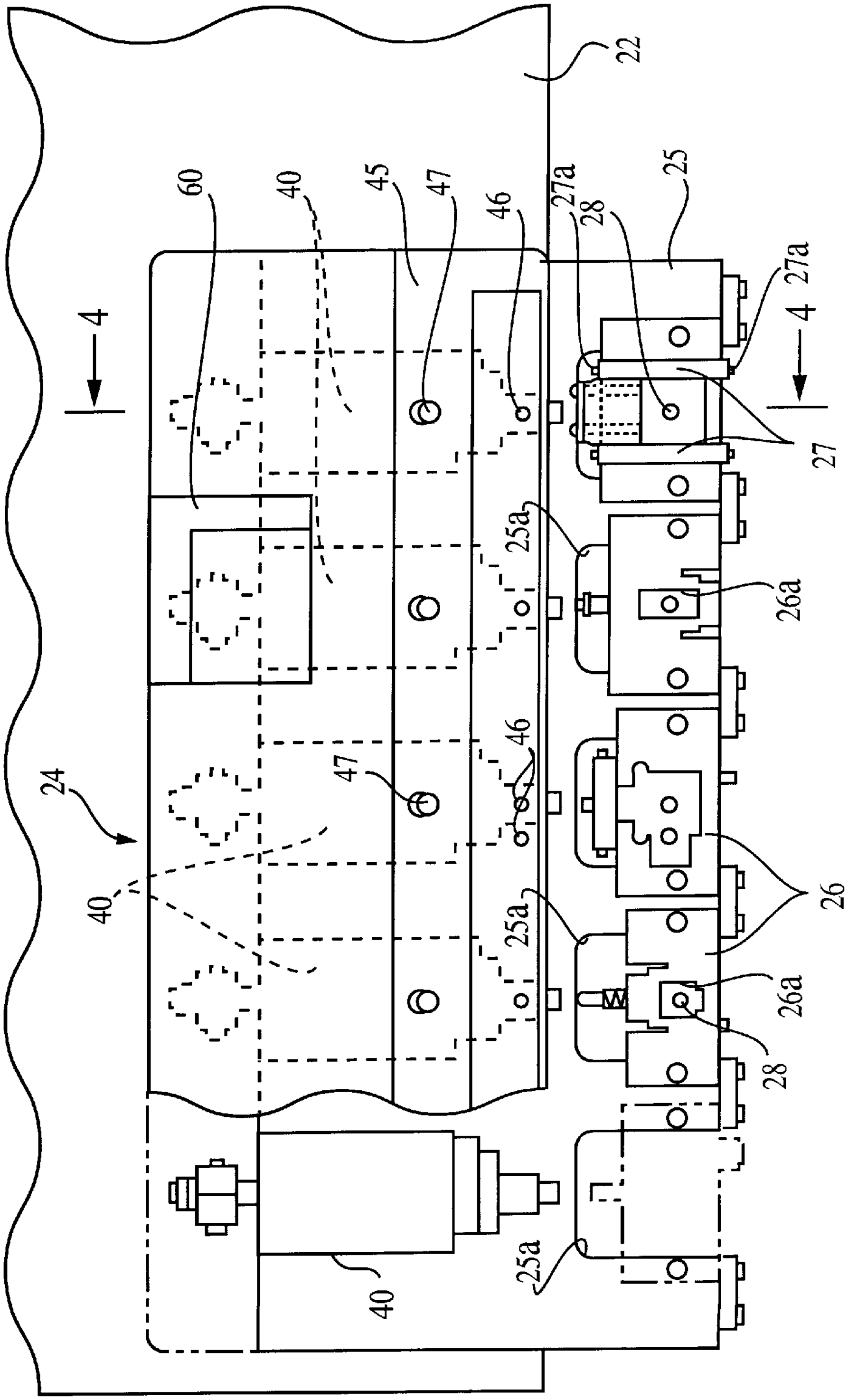
FIG. 3 is a schematic plan view of a connector holder, according to a preferred embodiment of the present invention.
Figure 4:
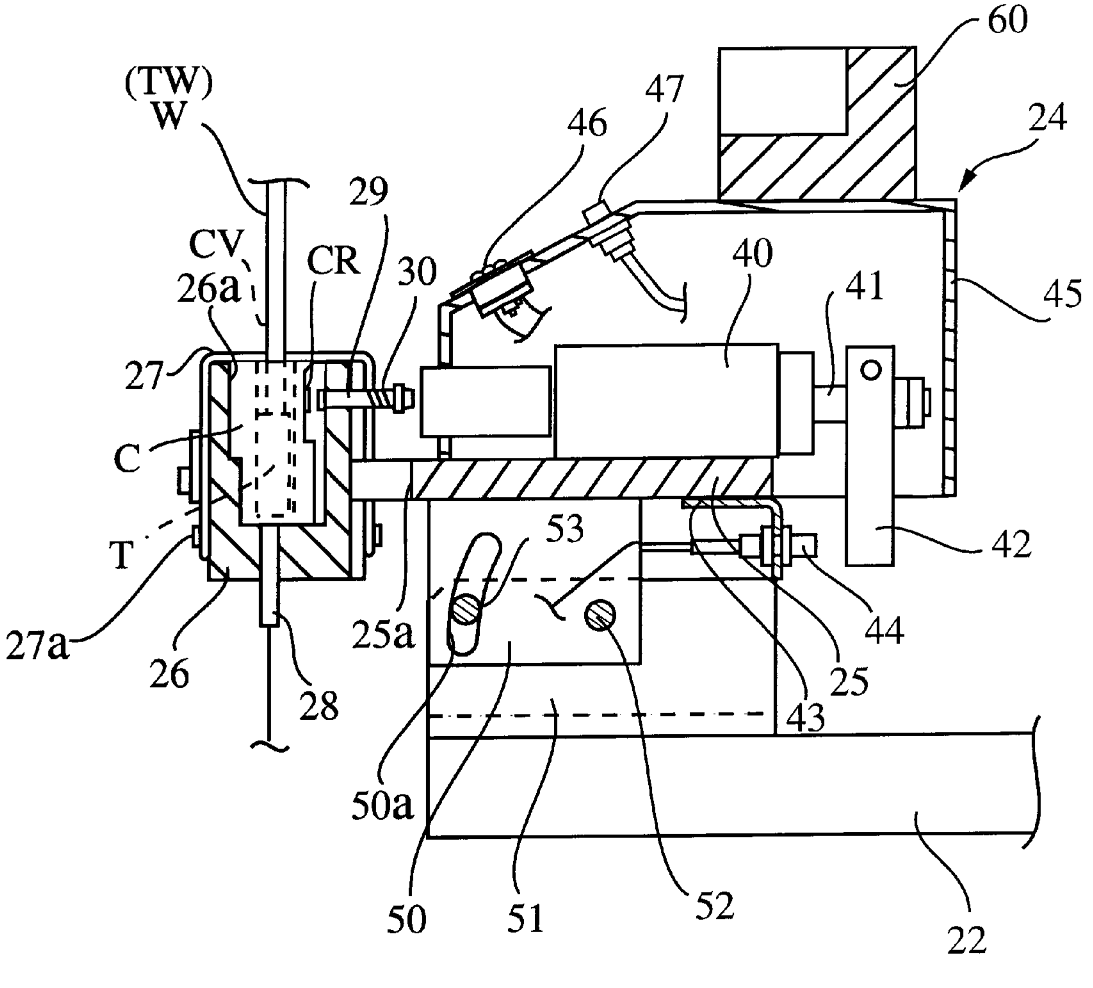
FIG. 4 is a sectional view taken along line 4—4 shown in FIG. 3.

Referring now to FIGS. 3 and 4, the connector holder 24 contains a base plate 25 and a holder block 26 mounted in compliance with a slit 25*a* provided in parallel with the base plate 25. Each holder block 26 is constructed from a resin mold and has a recessed area 26*a* which houses a connector C. As can be seen in FIG. 3, a number of different holder blocks 26 may be provided, with each different holder block having a recessed area 26*a* formed with a different configuration to receive connectors C having different configurations. Each holder block 26 is also provided with a pair of U-shaped holding members 27 (as shown in FIGS. 3 and 4)

which conform with the type of connector C received in the holder block to retain the connector within the recessed area of the block. The U-shaped holding members are pivotally mounted to the holder block 26, for example by pivot pins 27*a,* but they may be mounted in any suitable manner. Additionally, the holding members 27 are biased into the connector retaining position (the position shown for the holding members 27 depicted at the lower right hand side of FIG. 3) in any well know manner, such as by springs, and the holding members 27 may also be provided with manually engageable operating members (not shown).

Each connector C includes a lance (not illustrated) and a temporarily fastened retainer CR, and may utilize a double lance method for double fastening the terminal. Each recessed area 26*a* is shaped in accordance with the surface characteristics of the corresponding connector C. At the bottom of each recessed area 26*a,* a probe pin 28 is provided that protrudes from the bottom of the holder block 26. The probe pin 28 operates as a terminal detector and is electrically conductive with the terminal T inserted into the cavity CV and is connected to a control unit 200 to communicate the presence of a terminal T within the cavity and to ensure connection of the appropriate terminal T as discussed below.

A pressure pin 29 is slidably mounted in the end wall of each holder block 26. Each pressure pin 29 faces the retainer CR of the connector C housed in the corresponding connector holder 24, and is constructed so that the lance of the retainer CR can be fully fastened by pushing the retainer CR of the connector C after inserting the terminal. A rod 41 of an air cylinder 40 operates as a pressing mechanism and is described below. The pressure pin 29 is normally retracted from the recessed area 26*a* by a compression coil spring 3.

The air cylinder 40 is arranged on the base plate 25 in compliance with each holder, with the rod 41 opposedly arranged so that the pressure pin 29 can be pressed. Each rod 41 protrudes on both ends of the air cylinder 40. On the end opposite to the holder block 26, a gauge head 42 is fastened. The gauge head 42 extends below the base plate 25 and moves integrally with the rod 41. Proximity switch 44 is mounted with a stay 43 below the base plate 25, allowing the gauge head 42 to be detected when a displacement of the gauge head 42 has approached a predetermined value, following the pressure pin 29 pressed by the rod 41 of the air cylinder 40.

A pressing load of the pressure pin 29 by the cylinder 40 is set so that it will not exceed a predetermined load by a pressurized air supply mechanism (not shown). When the terminal attached wire TW is inserted into the cavity CV of the connector C, the rod 41 of the air cylinder 40 activates as a result of the probe pin 28 detecting the terminal T. Consequently, the retainer CR is pressed by the pressure pin 29 and is fully fastened. In addition, the gauge head 42 is displaced by the complete fastening. When the displacement is equal to the amount of normal displacement, the proximity switch 44 detects the gauge head 42. When the displacement is not the normal amount of displacement, the proximity switch 44 does not detect the gauge head 42.

Accordingly, a control unit 200, operating as a discriminator, discriminates whether the press fit condition between the terminal T and connector C is good or bad. The control unit 200 does not analyze the fastened condition of the retainer CR, but rather analyzes the press fit condition between the terminal T and the connector C. That is, the control unit 200 utilizes the property that a bad press fit condition between the terminal T and the connector C requires a load for press fitting the retainer CR that is larger than the normal load. The normal pressing load can press fit the retainer CR to the normal position causing the terminal T and the connector C to enter a normal press fit condition. Thus, the good/bad press fit condition between the terminal T and connector C is determined by measuring the amount of displacement of the retainer CR when the retainer CR is pressed with a predetermined load.

A metallic cover 45 covers the air cylinder 40 and is mounted on the base plate 25. A holder display light 46, which indicates a connecting area, is provided for each terminal to be inserted in a cavity of a respective connector (as seen in FIG. 3). The display lights 46 are connected to the control unit 200, which indicates the appropriate connector C into which the operator is to insert a respective terminal T by illuminating a light 46 positioned adjacent the appropriate connector C. Probe pin 28, also connected to control unit 200, confirms that the proper terminal T has been inserted. Also, a plurality of good/bad press fit indicating lights 47 are mounted on a slanted area of the cover 45, with one such light 47 being provided for each connector. Preferably, the slanted area faces the operator.

In order to mount the work bench 22 onto the connector holder 24, a bracket 50 and a bracket 51 are respectively mounted on the lower surface of the base plate 25 and upper surface of the work bench 22. Both brackets 50, 51 are connected with a pair of bolts 52, 53. In order to facilitate the operator's work, an arc-shaped hole 50*a* which centers the axis of the bolt 52 is formed on the bracket 50 of base plate 25. By inserting the bolt 53 into the hole 50*a,* the posture of the base plate 25 is adjustable by the length of the hole 50*a* around the bolt 53. On the upper surface of the cover 45, a pair of mounting members 60 is fastened. Cartridge 61, which supports the terminal attached wire TW, is mounted to the mounting member 60.

FIG. 5 is a schematic plan view showing a partially broken-away view of the cartridge 61. The cartridge 61 enables automatic insertion of the end area of the terminal attached wire TW by the automatic insertion device, and initially supports the end area. The cartridge 61 is provided with a resin mounting frame 61*a* of a roughly cubic form, and resin blocks 62, 63. The blocks 62, 63 are detachably fastened to the mounting frame 61*a* in pairs. The blocks 62, 63 are structured so that terminal areas of each terminal attached wire TW are equidistantly spaced by press fitting each of the terminals T of the terminal attached wires TW and insulated wires W into grooves in the block 62, 63, respectively.

The operator of the wire connection supporting device 20 should align the terminal areas of the terminal attached wires with the cartridge 61 prior to placing it in the automatic insertion device 70. Subsequently, manual wire connection work is performed or another end area of another terminal attached wire TW can be automatically inserted by the automatic insertion device 70.

Figure 6:
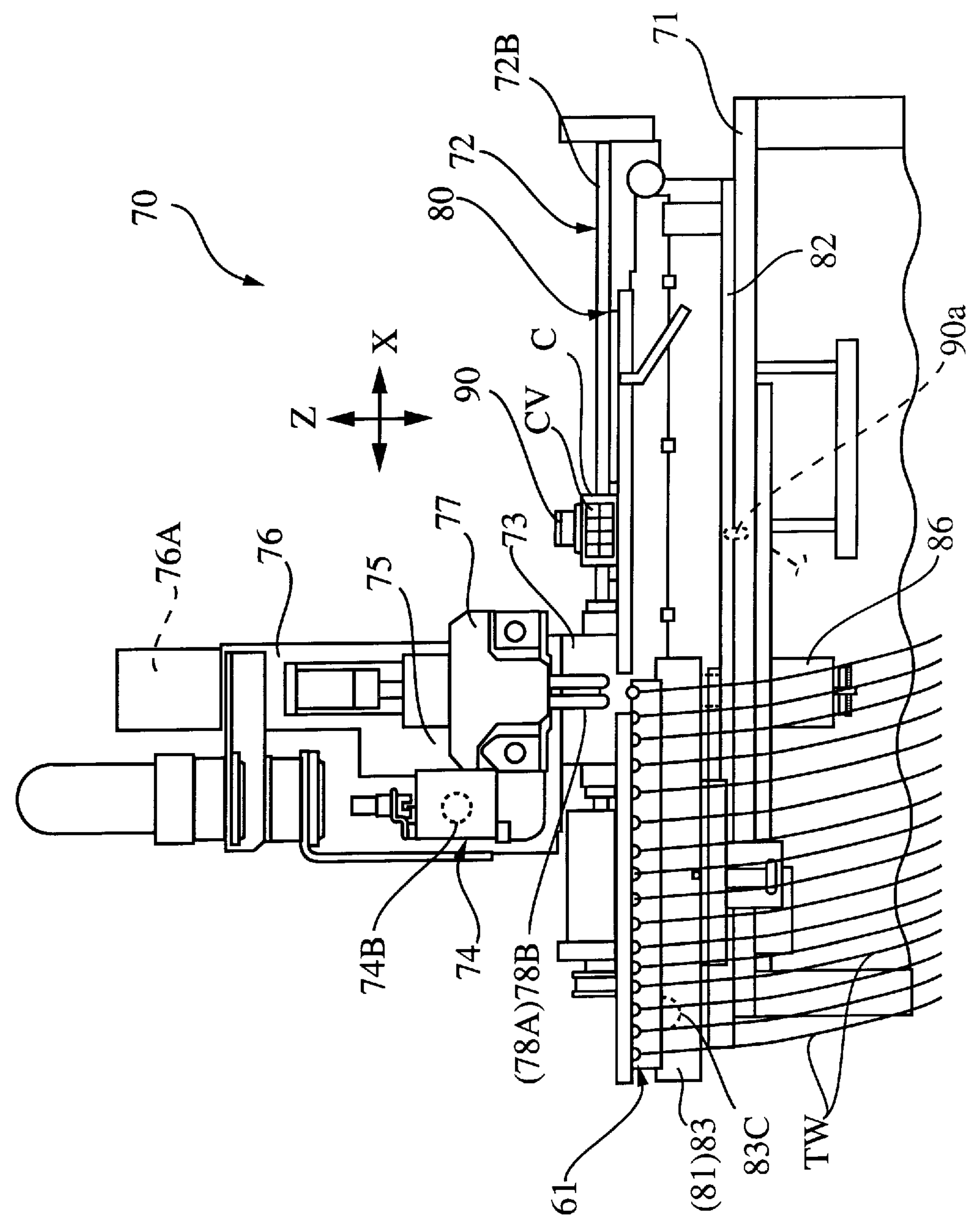
FIG. 6 is a schematic elevation view of an automatic insertion device, according to a preferred embodiment of the present invention.
Figure 7:
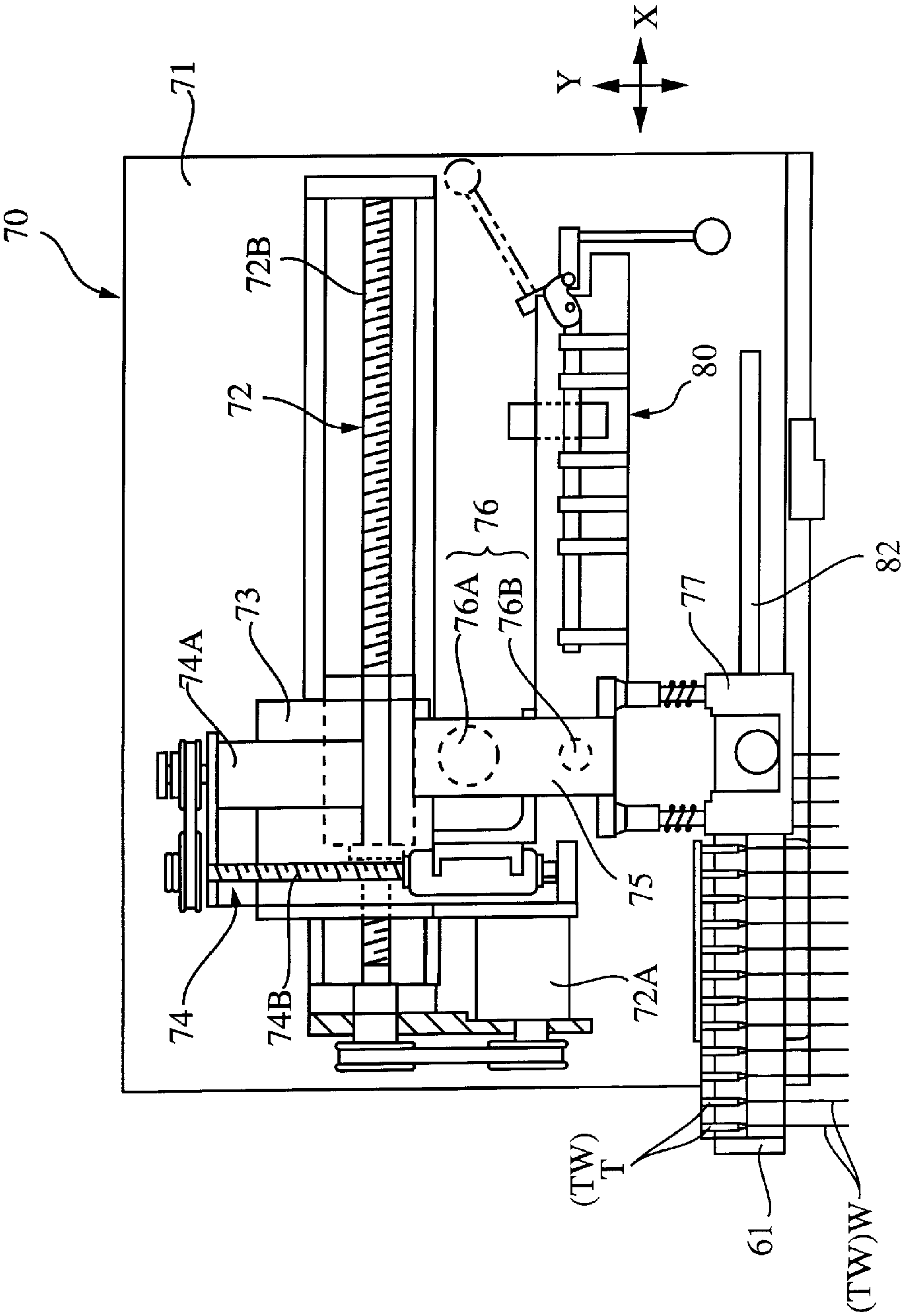
FIG. 7 is a schematic plan view of the automatic insertion device shown in FIG. 6.
Figure 8:
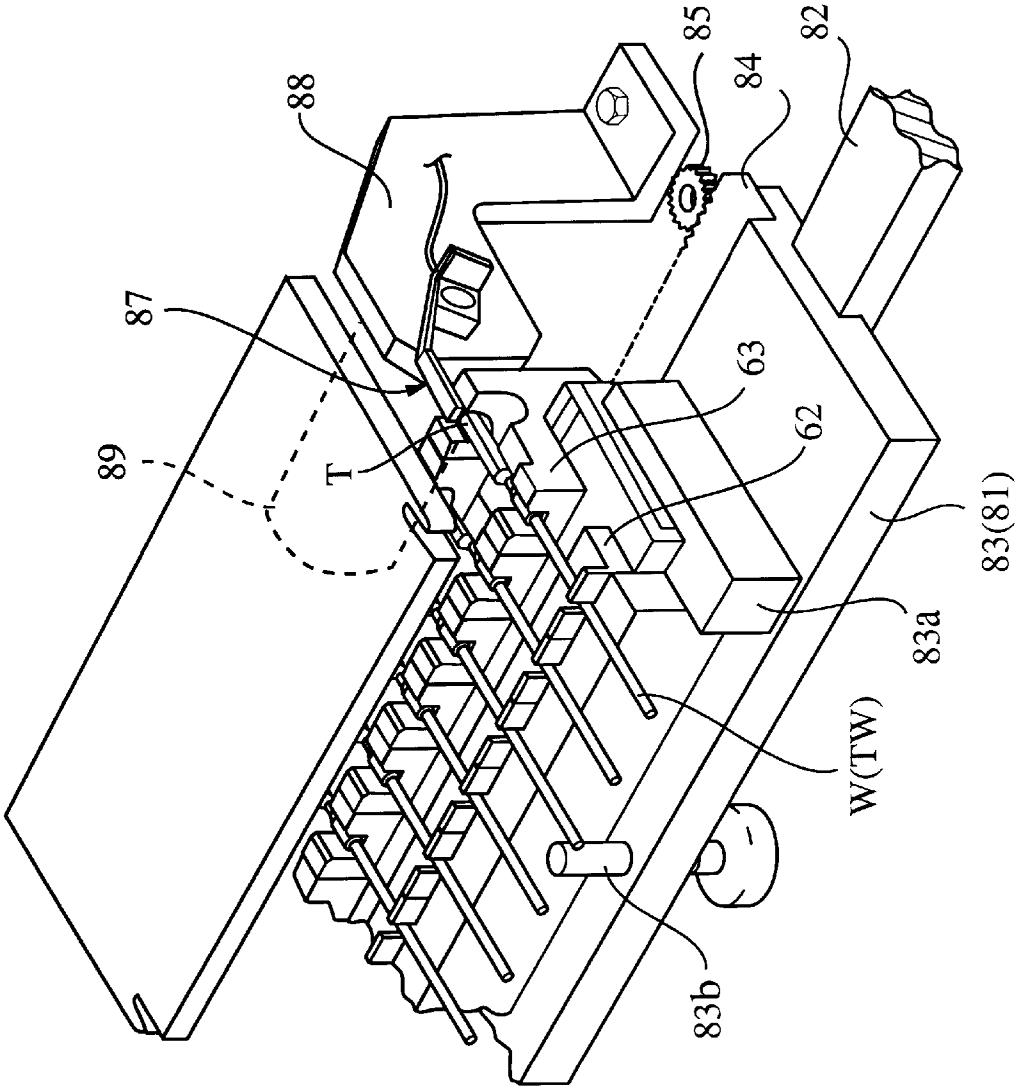
FIG. 8 is a perspective view showing selected features of the automatic insertion device shown in FIGS. 6 and 7.
Figure 9B:
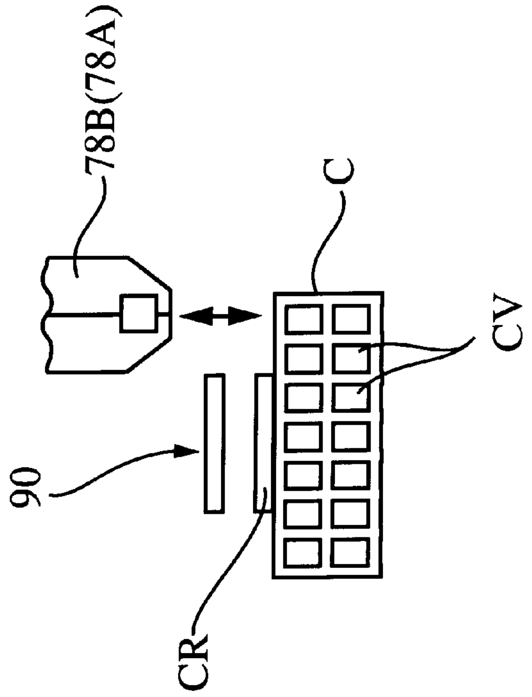
FIG. 9(B) is an enlarged elevation view of the cartridge shown in FIG. 6.
Figure 9A:
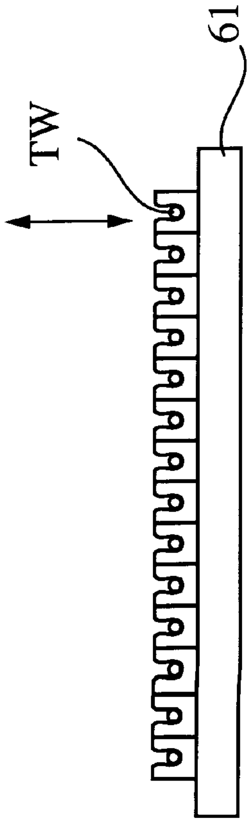
FIG. 9(A) is a sectional drawing schematically depicting an insertion action of the automatic insertion device shown in FIG. 6.
Figure 10:
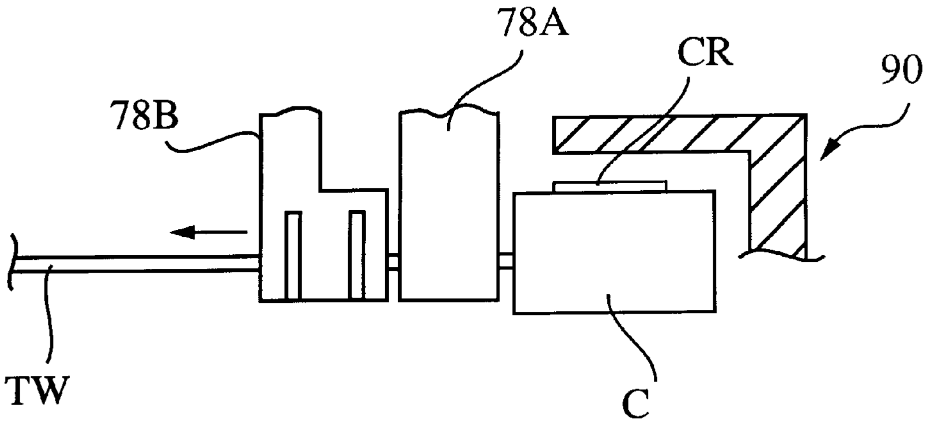
FIG. 10 is a sectional drawing schematically depicting an insertion action of the automatic insertion device relating to the embodiment shown in FIG. 1.

FIG. 6 is a schematic elevation view of the automatic insertion device, FIG. 7 is a schematic plan view of the automatic insertion device, and FIG. 8 is a perspective view showing a selected area of the automatic insertion device. As shown in FIGS. 2, 6 and 7, the automatic insertion device 70 is mounted on a base 71 equipped with an X-axis ball screw mechanism 72 which extends horizontally along the right and left directions (hereinafter referred to as X-axis for each drawing). The movable frame 73 can be moved in the X direction by the horizontal ball screw mechanism 72. A Y-axis ball screw mechanism 74 is mounted on a movable frame 73, which is moved by the X-axis ball screw mechanism 74, and extends horizontally along a horizontal direction (hereinafter referred to as the Y direction) that perpendicularly intersects the X direction. A casing 75 is reciprocally movable in the Y direction by the Y-axis ball screw mechanism 74. A Z-axis ball screw mechanism 76 extends along a vertical direction (hereinafter referred to as the Z direction) and is mounted on the casing 75. An elevating body 77 is provided which is driven in relation to the casing 75. Thus, the elevating body 77 is structured so that by mounting a terminal clamp 78A, which holds the terminal area of the terminal attached wire TW, and a wire clamp 78B for clamping the wire area to the elevating body 77, automatic insertion takes place into the connector C held by the connector holder 80 supported by the base 71 by holding the end area of the terminal attached wire TW after moving each clamp 78A, 78B in the X, Y and Z directions.

It is well known that the ball screw mechanisms 72, 74, 76 rotate and the drive ball screws 72B, 74B, 76B, utilizing motors 72A, 74A, 76A as power sources. Thus, each clamp 78A, 78B can be driven in a relatively precise manner through the movable frame 73, casing 75, and elevating body 77 by a rotary encoder, etc.

In order to supply the terminal attached wires TW to the clamps 78A, 78B, a cartridge holder 81 is provided on the front area of the base 71. Thus, by mounting the cartridge 61 on the cartridge holder 81, the terminal attached wires TW, initially arranged by the operator, can each be held. More particularly, the cartridge holder 81 contains a slide plate 83 which is movable along the X direction on a rail 82 which extends in the X direction. A rack gear 84 is fastened to one side of the slide plate 83, and a pinion gear is provided which meshes with the rack gear 84. The slide plate 83 contains a positioning rib 83*a* which determines the position of the cartridge 61. A handle-attached stop rod 83*b* is also provided to allow stopping of the positioned cartridge 61, which is detachably held by the members 83*a*, 83*b* so that the terminal area of the terminal-attached wire TW extends in the Y-direction. By driving the pinion gear 85 with a motor 86, the terminal area of the terminal-attached wires TW is positioned immediately below the home position of clamps 78A, 78B. In order to control the motor 86, a cartridge detection sensor 83C (FIGS. 7 and 13) is provided on the cartridge holder 81 for detecting whether the cartridge 61 is mounted on the slide plate 83.

According to a preferred embodiment, an electrically conductive head 87 (see FIG. 8) is provided immediately below the home position of the clamps 78A, 78B opposite the terminal T of the terminal-attached wire TW. The conductive head 87 is rotatably mounted on a stay 88 which stands on the base 71. The conductive head 87 is electrically connected with the terminal-attached wire TW which will be delivered to the clamp 78A, 78B, by rotation around the X-axis by a motor 89 mounted on a stay 88, and to the control unit 200. Accordingly, the electrically conductive head 87 provides a signal to the control unit 200 to indicate the terminal attached wire TW to be inserted into a connector C by the automatic insertion device 70. The control unit 200 then actuates the appropriate display light 46 to designate to the operator which connector C in connector holder 24 the opposite end of the terminal attached wire TW is to be inserted. The control unit 200 includes a memory, which for example may be a microprocessor, that stores connection data for connecting terminally attached wires TW to connectors C held in the connector holder 24 as well as the connectors C held in the cartridge 61 that are inserted by the automatic insertion device.

With reference to FIG. 6, the connector holder 80 is provided with a pressing mechanism 90, which is similar in principle to the pressure pin 29 and air cylinder 40 explained with reference to FIG. 4. The pressing mechanism 90 permits the retainer CR to be finally fastened by pressing the retainer CR of the connector C held when the terminal insertion process is completed. A proximity sensor 90*a* is also provided and is similar to the proximity switch 44 explained with reference to FIG. 4. Thus, based on the amount of pressure, a good/bad press fit between the terminal T and the connector C can be determined by the control unit 200. Because the structure is similar to the structure described with reference to FIG. 4, a description is omitted here.

Figure 11:
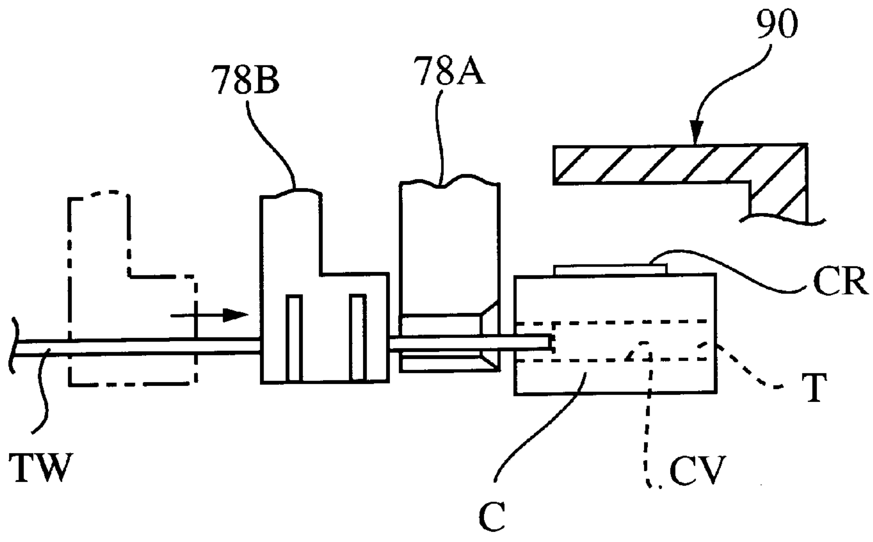
FIG. 11 is a sectional drawing schematically depicting an insertion action of the automatic insertion device relating to the embodiment shown in FIG. 1.
Figure 12:
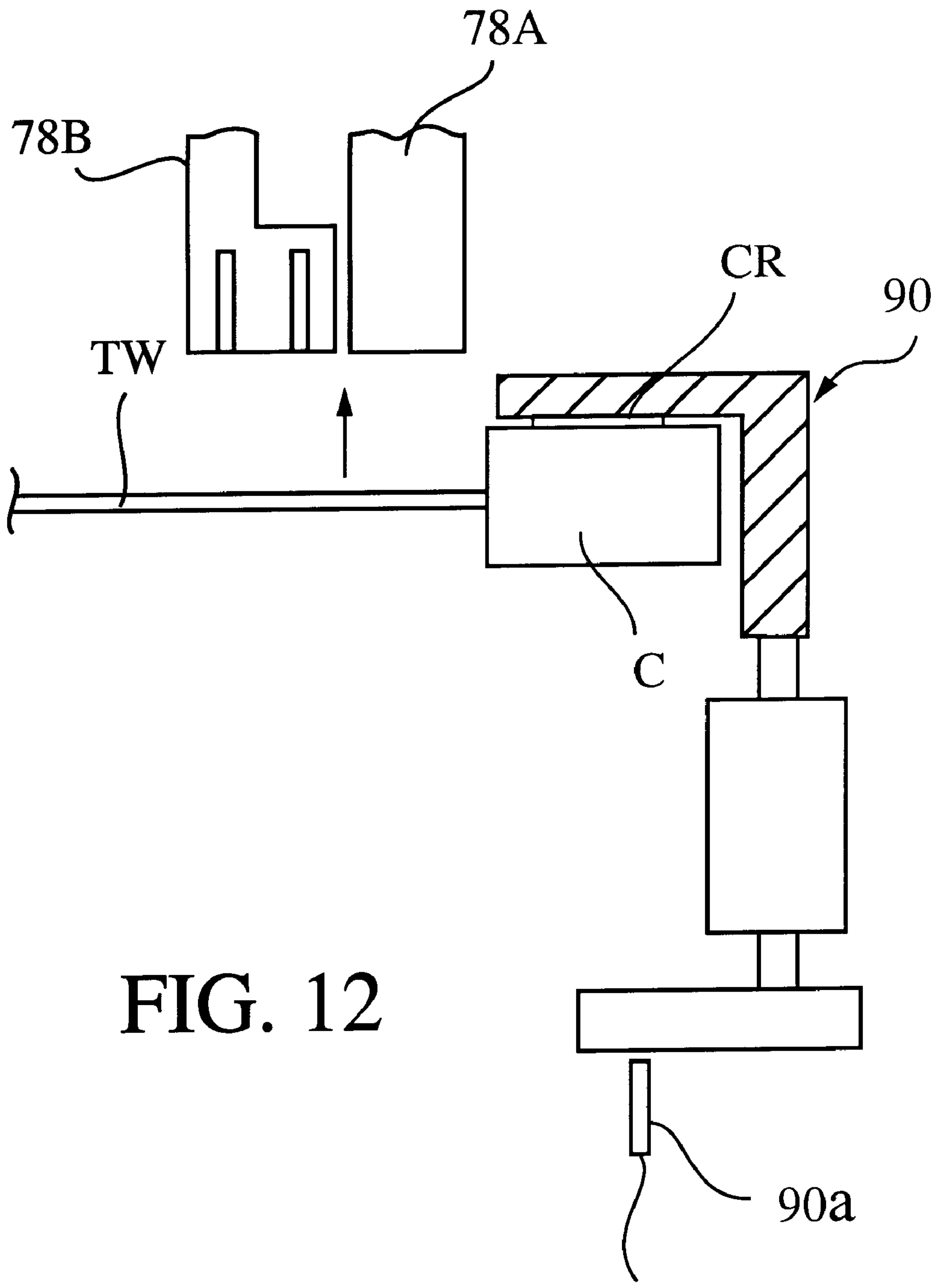
FIG. 12 is a sectional drawing schematically depicting an insertion action of the automatic insertion device relating to the embodiment shown in FIG. 1.

FIGS. 9–12 are explanatory drawings schematically showing the inserting motion of the automatic insertion device according to a preferred embodiment, although the particular details of the operation of the automatic insertion device have not been described since such details form no part of the present invention. The clamps 78A, 78B are structured so that they lower with the elevating body 77 from the home position to grasp the terminal area of the terminal-attached wire TW which is transferred towards the connector C. After temporarily being inserted into the cavity CV of the connector C, as shown in FIG. 11, the final insertion occurs by raising the wire clamp 78B, as shown in FIG. 12. Finally, the terminal-attached wire TW is released after completing the final insertion. The retainer CR is finally fastened by the pressing mechanism 90 after the terminal insertion process is completed.

The wire connection supporting device 22 may now be utilized to carry out the accompanying work which is difficult to perform with the automatic insertion device 70. Accordingly, a known grommet enlarging device 100 and an electric wire twisting device 110 are provided to be utilized together as exemplary accompanying work treatment devices. The grommet enlarging device 100 is a work supporting device which facilitates operator insertion of the terminal-attached wire TW into the grommet by enlarging a ring-shaped rubber grommet.

The electric wire twisting device 110 forms a twisted wire by twisting a plurality of terminal-attached wires TW. A movable body 112 is mounted on a base 111 provided in a longitudinal direction of the electric wire housing 21. The terminal-attached wire TW is held by a rotating manipulator 113, provided at one end of the movable body 112, and is rotated. And then, a continuous twisted wire is achieved by moving the movable body 112 while carrying out the rotating work followed by double motion of the reciprocal movable body 112.

Although not shown, on the work bench 22 a grommet indicating lamp for indicating usage of the grommet enlarging device 100 is provided when insertion of the terminal-attached wire into the grommet is necessary. A twisted wire indicating lamp 115 is also provided to indicate the usage of the electric wire twisting device 110 when it is necessary to form a twisted wire. Likewise, the grommet enlarging device 100 and electric wire twisting device 110 can output signals informing a connection supporting device control unit 210 (FIG. 13) of control unit 200 of the completion of the process.

Figure 13:
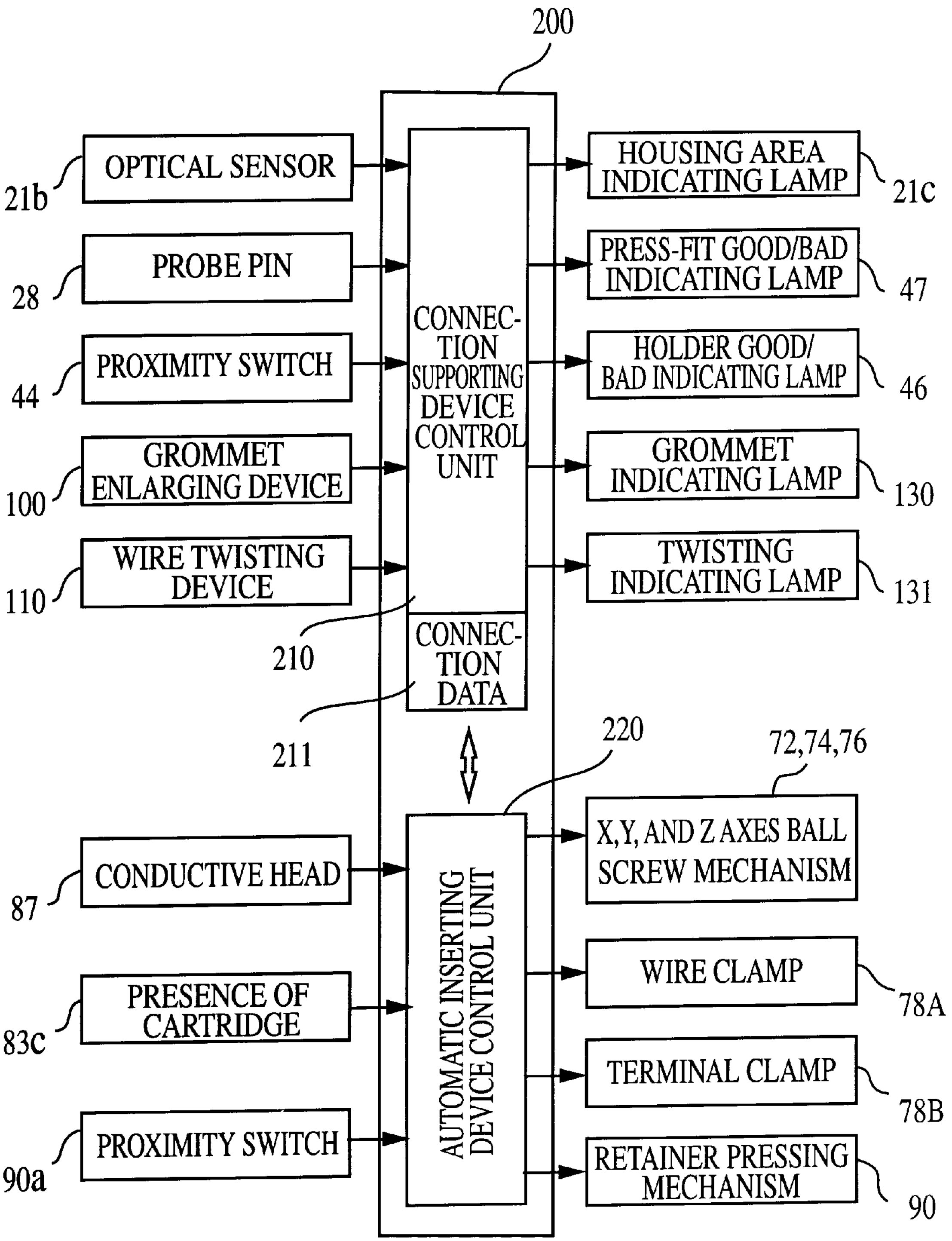
FIG. 13 is a block-diagram of a control device, according to a preferred embodiment of the present invention.

FIG. 13 is a block diagram of a control unit 200 according to a preferred embodiment. An electric wire connection supporting device control unit 210 is provided for controlling the electric wire connection supporting device 20, and an automatic insertion device control unit 220 is provided for controlling the automatic insertion device 70. Each control unit 210, 220 is part of the control unit 200 of connection station S.

Each control unit 210, 220 includes various electrical equipment such as a microprocessor. A memory 211 is provided in the electric wire connection supporting device control unit 210, and is equipped to memorize connection data required for connecting each kind of terminal-attached wire TW or connector of a sub-assembly to be manufactured. In addition, the association between cavities CV being connected with terminal T of the various terminal-attached wires TW is stored in the memory 210. The automatic insertion device control unit 220 drives the automatic insertion device 70 in association with the electric wire connection supporting device 20 based on the data stored in the memory 211 and a computer program.

Figure 14:
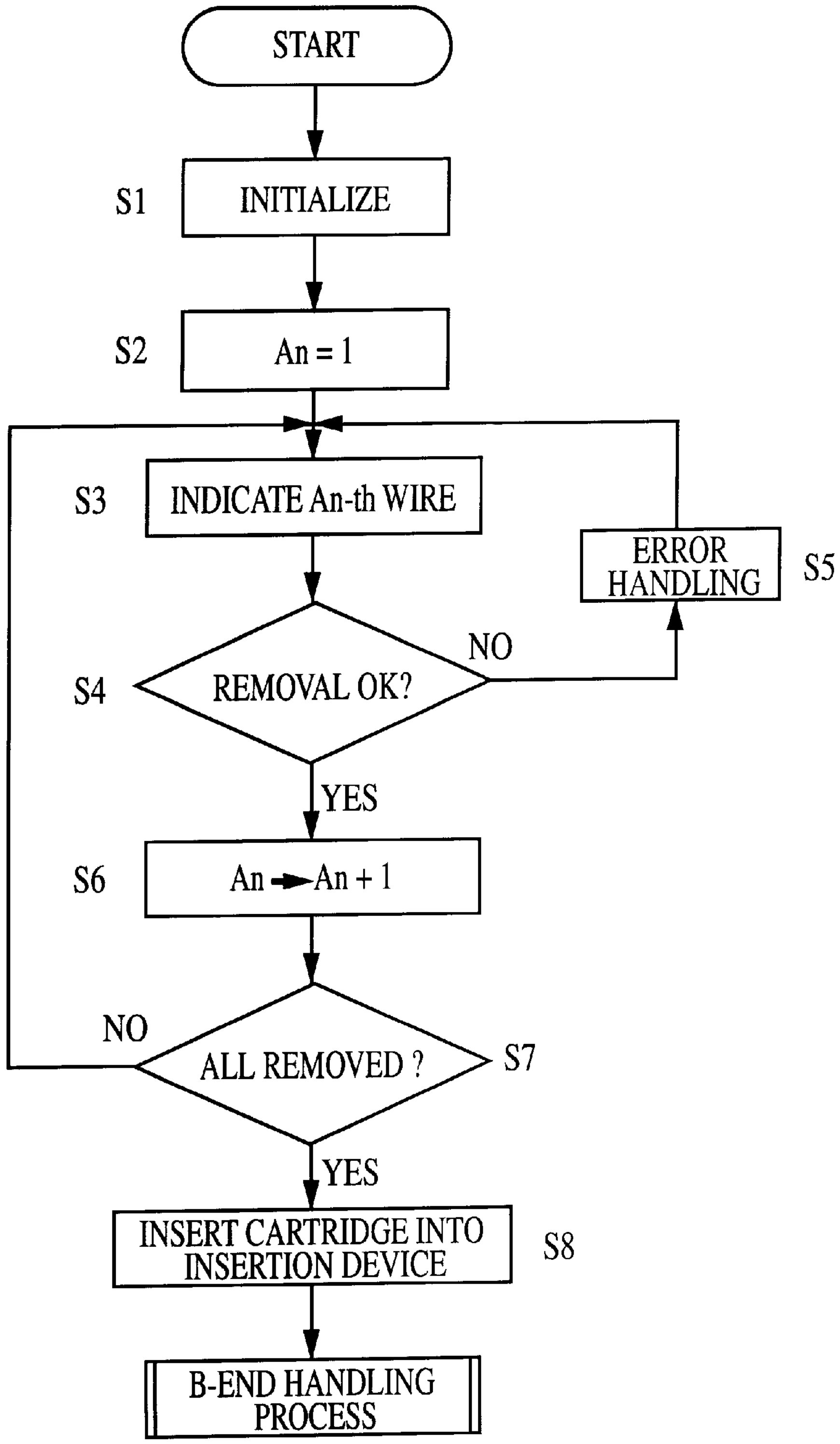
FIG. 14 is a flow chart showing an exemplary process that facilitates mounting terminal-attached wires into a cartridge by an operator, according to a preferred embodiment of the present invention.
Figure 15:
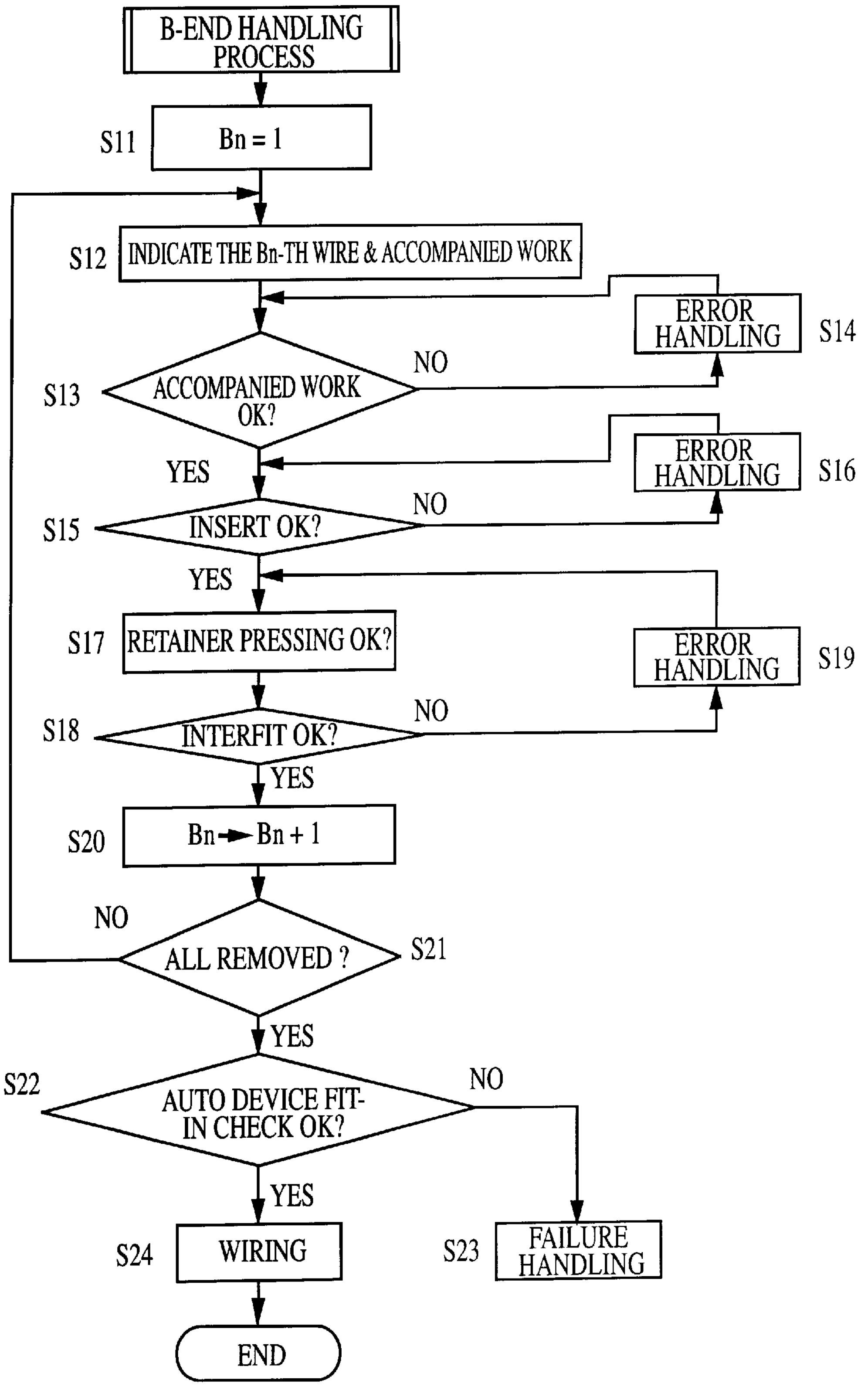
FIG. 15 is a flow-chart showing an exemplary procedure of a B-end treatment process, according to a preferred embodiment of the present invention.
Figure 16:
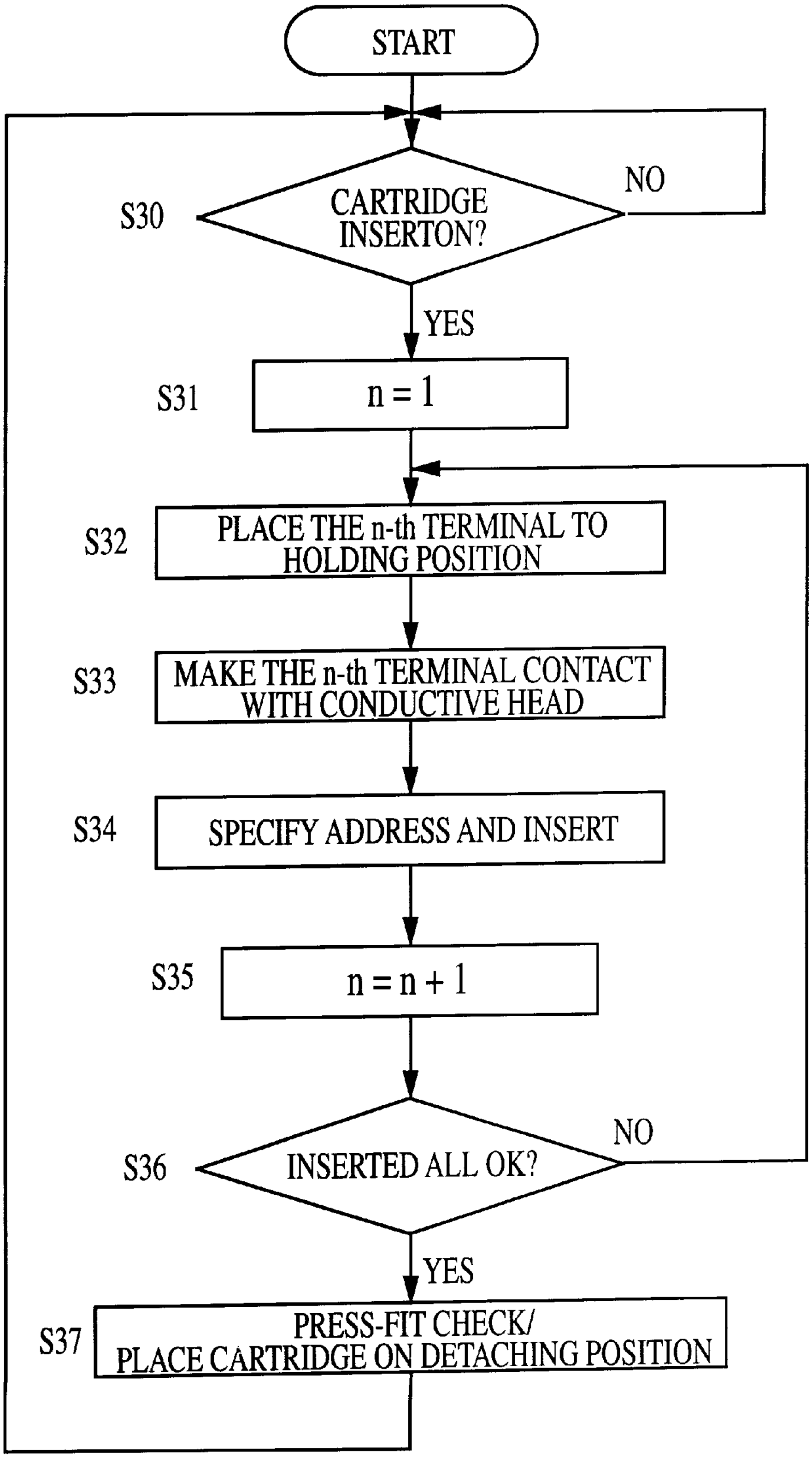
FIG. 16 is a flow-chart showing exemplary insertion procedures for an automatic insertion device which are performed simultaneously with a manual terminal connection operation, according to a preferred embodiment of the present invention.

With reference to FIGS. 14–16 a description is provided for the operating procedures of the above-mentioned devices. FIG. 14 is a flow chart showing an exemplary process in which an operator supplies cartridges having manually mounted terminals to the automatic insertion device 70.

Initially, at step S1 initialization occurs, followed by inputting a computer program and connection data into the control unit 200. In addition, routine work for each area is performed and premounting necessary connectors C to the connector holder 80 of the automatic insertion device 70 occurs.

After commencing operation of wire assembling manufacturing equipment 10, the conveyor 12 transports the wiring board 11 at a predetermined transport speed, while in the connection station S, connection of the terminal-attached wires TW begins. In the connection work, initially because the operator specifies the terminal-attached wire TW to be taken out, number An of the terminal-attached wire TW is initialized (An=1) at step S2. Then, at step S3, the indicating lamp 21*c* is illuminated where the An-th terminal-attached wire is to be removed from the gate 21*a* of the wire-housing area 21.

The operator takes the terminal-attached wire TW from the gate 21*a* where the indicating lamp 21*c* is illuminated in sequence, and then mounts it, starting from the left side, onto the cartridge 61. The cartridge 61 is installed on the upper surface of the cover 45 of the connector holder 24 through the mounting member 60. In step S4, the optical sensor 21*b* installed on the gate 21*a* indicates whether the proper terminal-attached wire TW has been removed. If the terminal-attached wire TW is different from the indicated terminal-attached wire TW, an error indication occurs (for example, a buzzer sounds, and the indicated data is reset). Logic then returns to step S3 and repeats. When the proper terminal-attached wire TW is removed, at step S6 the number An of the terminal-attached wire TW is updated (i.e., from An to An+1). At step S7 it is determined whether the operation has been completed. If the operation has not been completed, the logic returns to step S3 and repeats.

On the other hand, when all of the terminal-attached wires TW are mounted on the cartridge 61, at step S8 the operator moves the cartridge 61 from the mounting member 60 to the cartridge holder 81 of the automatic insertion device (which will hereinafter be termed the A-end treatment area. The operator then moves to a B-end treatment area for working on the terminal area of each terminal-attached wire TW at the ends opposite to the terminal area held by the cartridge 61 (A-end), while the automatic insertion device 70 automatically inserts the terminal T of each terminal-attached wire TW simultaneously with the B-end treatment process.

FIG. 15 is a flow chart showing an exemplary procedure for executing the B-end treatment process. When the insertion process proceeds to the B-end treatment, the control unit 200 initializes number Bn of the terminal-attached wire TW to be removed (Bn=1) in step S11. Subsequently, the indicating lamp 21*c* is illuminated to indicate the terminal-attached wire to be removed. The indicating lamp 21*c* is mounted on the gate 21*a* of the electric wire housing area 21 by the number Bn terminal-attached wire. Then, if accompanying work, such as mounting an external device and twisting work, etc., are required for the terminal-attached wire TW being removed, the operator is notified by illumination of the indicating lights 114, 115 mounted on the work bench 22. Then, in step S13 when the accompanying work exists, the operator determines whether the work was performed. When the work has not been performed, error handling occurs at step S14 and the process repeats at step S13.

On the other hand, when accompanying work is not necessary or has been successfully completed, the operator inserts the terminal-attached wire TW removed from the gate 21*a* into a connector C which is mounted in each holder block 26 of connector holder 24. At step S15 it is determined whether the terminal T has been inserted into the appropriate cavity CV by a probe pin 28 installed in the holder block 26. If it is inserted into the wrong cavity, error handling occurs at step S16 and the insertion is repeated. When the probe pin 28 indicates the insertion is proper, final fastening of the retainer CR is made by pressing the retainer CR through the pressure pin 29 by the rod 41 of the air cylinder 40 in step S17. The adequacy of the press-fit condition between the terminal T and the connector C is judged at step S18. When the press-fit condition is bad, error handling occurs at step S19 and the logic returns to step S17. When the press-fit condition is good, the number Bn of the terminal-attached wire TW is updated (Bn=Bn+1) at step S20. At step S21 it is determined whether the process is complete. When the process has not been completed, the logic returns to step S12 and repeats.

On the other hand, when all the terminal-attached wires TW are inserted, at step S22 the process waits for the completion of the press-fit by the automatic insertion device 70. If the automatic insertion devices operation is unacceptable, at step S23 error handling occurs. If the press-fit is acceptable, at step S24 the procedure advances to the wiring work where the operator takes terminal-attached wires TW, which have now become a wire assembly WA after completing the connection work, to the wiring board 11 and mounts the wire assembly WA on the wiring board 11.

FIG. 16 is a flow chart showing an insertion procedure utilized by the automatic insertion device at the A-end area, to be carried out simultaneously with the terminal connection work performed manually at the B-end area. Initially, at step S30, the control unit 200 waits for the mounting of the cartridge 61. When the cartridge 61 is mounted, each clamp 78A, 78B initializes (n=1) the number n of terminal T to be inserted at step S31. Then, at step S32, the n-th terminal area is transported to a position where it can be held by the clamps 78A, 78B. Next, at step S33 the conductive head 87 is rotated to make contact with the terminal T being transported. Therefore, the control unit 200 specifies the terminal attached wire TW based on the input from the probe pin 28, and the input from the conductive head 87, thereby making it possible for the automatic insertion device 70 to specify the cavity CV of the terminal T to be filled.

An exemplary specifying method is described in detail in Japanese Unexamined Patent Publication No. (Hei) 6-309080 (also referred to as Japanese Unexamined Patent Publication No. (Hei) 8-167333)) discussed earlier, by specifying an insertion sequence of the terminal T to the operator in accordance with sequential procedures, the terminal-attached wire TW may be specified. Alternatively, the operator may specify the terminal-attached wire TW based on the detection of the terminal T inserted in an optional order. However, in the former case when the cavity CV of the connector C has an upper and lower level, automatic insertion occurs initially in the lower level. Therefore, the terminal-attached wire TW does not interfere with the clamps 78A, 78B. Thus, at step S34 the address is specified and the insertion occurs.

When the terminal attached wire TW is connected, the number n of the terminal-attached wire TW is updated (n=n+1) at step S35. At step S36 it is determined whether the process is complete. When some terminal-attached wires TW are still left, the logic returns to step S32 and repeats. On the other hand, when all the terminal-attached wires TW are inserted, the press-fit check is carried out at step S37, and the cartridge is placed into a detaching position. Finally, the logic returns to step S30 and the result is output.

As explained above, by working with the automatic insertion device 70, wire assemblies WA are rapidly and accurately manufactured, thereby making it possible to more effectively manufacture wire assemblies WA.

While the invention has been described with reference to exemplary embodiments, it is understood that the words which have been used are words of description and illustration, rather than words of limitation. Changes may be made, within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods and uses, such as are within the scope of the appended claims.

The present disclosure relates to subject matter contained in priority Japanese Patent Application No. 9-359948 (filed on Dec. 26, 1997) which is expressly incorporated herein by reference in its entirety.

What is claimed is:

1. A wire assembly manufacturing apparatus equipped with a wire connection supporting device, the apparatus comprising:

a plurality of wire housing areas which house wires previously classified by type, the wires being terminal-attached wires formed by attaching a terminal to at least one end of a measured length of insulated wire;

a cartridge configured to receive terminals of the terminal attached wires;

a connector holder for holding at least one connector, each connector configured to receive a respective terminal of the terminal-attached wires;

a wire specifying system that specifies a type of connector for a terminal-attached wire removed from the wire housing area;

a memory that stores connection data for connecting the terminal-attached wire specified by the wire specifying system;

a designator that designates to an operator, a cavity of the connector which corresponds to the terminal of the terminal-attached wire specified by the specifying system based on the stored connection data;

an automatic insertion device provided on the wire connection supporting device, said automatic insertion device configured to insert the terminal of a terminal-attached wire into a connector after removing the terminal from said cartridge, said cartridge being mounted on a cartridge holder, the automatic insertion device retaining a cartridge capable of holding in an aligned condition, a terminal area at the opposite end of the terminal to be connected with the connector mounted on the connector holder, the automatic insertion device also retaining the cartridge holder for detachably holding the cartridge; and a controller that controls the terminal insertion action of the automatic insertion device based on the connection data for the terminal-attached wire specified by the wire specifying system.

2. The wire assembly manufacturing equipment of claim 1 further comprising:

a connector to be inserted by one of the wire connection supporting device and the automatic insertion device, the connector comprising a double lance type having a temporarily fastened retainer;

a press mechanism capable of pressing with a predetermined load in order to finally fasten the retainer which is temporarily fastened to the double lance type connector;

a measuring system capable of measuring the displacement of the retainer pressed by the pressing mechanism; and a discriminator that discriminates a good/bad condition between the connector and the terminal based on the displacement of the retainer.

3. The wire assembly manufacturing equipment of claim 1, in which the wire connecting supporting device further comprises an accompanying work treatment system to manually carry out accompanying work on the end of the wire opposite to the end area retained by the cartridge.

4. The wire assembly manufacturing equipment of claim 2, in which the wire connecting supporting device further comprises an accompanying work treatment system to manually carry out accompanying work on the end of the wire opposite to the end area retained by the cartridge.

5. The wire assembly manufacturing equipment of claim 1 further comprising:

a conveyor mounted near the wire connection supporting device, the conveyor transporting a wiring board to enable wiring of the terminal-attached wire which becomes a wire assembly after completing the connecting work; and an alarm which indicates to an operator a time for wiring the terminal-attached wire by detecting the approach of the wiring board to the wire connection supporting device.

6. The wire assembly manufacturing equipment of claim 2 further comprising:

a conveyor mounted near the wire connection supporting device, the conveyor transporting a wiring board to enable wiring of the terminal-attached wire which becomes a wire assembly after completing the connecting work; and an alarm which indicates to an operator a time for wiring the terminal-attached wire by detecting the approach of the wiring board to the wire connection supporting device.

7. The wire assembly manufacturing equipment of claim 3 further comprising:

a conveyor mounted near the wire connection supporting device, the conveyor transporting a wiring board to enable wiring of the terminal-attached wire which becomes a wire assembly after completing the connecting work; and an alarm which indicates to an operator a time for wiring the terminal-attached wire by detecting the approach of the wiring board to the wire connection supporting device.

8. The wire assembly manufacturing equipment of claim 4 further comprising:

a conveyor mounted near the wire connection supporting device, the conveyor transporting a wiring board to enable wiring of the terminal-attached wire which becomes a wire assembly after completing the connecting work; and an alarm which indicates to an operator a time for wiring the terminal-attached wire by detecting the approach of the wiring board to the wire connection supporting device.

9. An inspection apparatus for determining the condition of a connector having at least one terminal attached wire inserted into a cavity therein, the connector being formed as a double lance type having a temporarily fastened retainer, said inspection apparatus comprising:

a press mechanism capable of pressing with a predetermined load in order to finally fasten the retainer which is temporarily fastened to the double lance type connector;

a measuring system capable of measuring the displacement of the retainer pressed by the pressing mechanism; and a discriminator that discriminates a good/bad condition between the connector and the terminal based on the displacement of the retainer.

* * * * *

UNITED STATES PATENT AND TRADEMARK OFFICE

CERTIFICATE OF CORRECTION

PATENT NO. : 6,141,867 
DATED : November 7, 2000
INVENTOR(S) : K. Fukada et al.

It is certified that error appears in the above-identified patent and that said Letters Patent is hereby corrected as shown below:

Title page,
Item [56], References Cited, Foreign Patent Documents, the followng references were omitted and should be included:
-- 9-017253 1/1997 Japan
8-167333 6/1996 Japan --

Title page,
Item [56], References Cited, Other Publications, the following references were omitted and should be included:
-- An English Language Abstract of JP 9-017253
An English Language Abstract of JP 8-167333 --.

Signed and Sealed this

Second Day of October, 2001

*Attest:*

Nicholas P. Godici

NICHOLAS P. GODICI

*Attesting Officer* *Acting Director of the United States Patent and Trademark Office*

UNITED STATES PATENT AND TRADEMARK OFFICE

CERTIFICATE OF CORRECTION

PATENT NO. : 6,141,867
DATED : November 7, 2000
INVENTOR(S) : K. Fukada et al.

It is certified that error appears in the above-identified patent and that said Letters Patent is hereby corrected as shown below:

Title page,
Item [56], References Cited, FOREIGN PATENT DOCUMENTS, the following references were omitted and should be included:

-- 9-017253 1/1997 Japan
8-167333 6/1996 Japan --

OTHER PUBLICATIONS, the following references were omitted and should be included:

-- An English Language Abstract of JP 9-017253
An English Language Abstract of JP 8-167333 --.

Signed and Sealed this

Nineteenth Day of October, 2004

JON W. DUDAS
*Director of the United States Patent and Trademark Office*